(No Model.)
G. P. KENEHAN.
DIE FOR MAKING BELT FASTENERS.
No. 448,835. Patented Mar. 24, 1891.
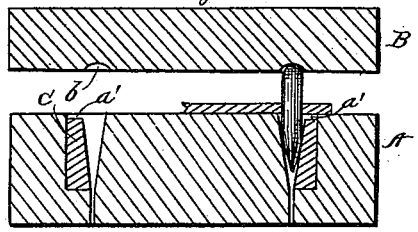
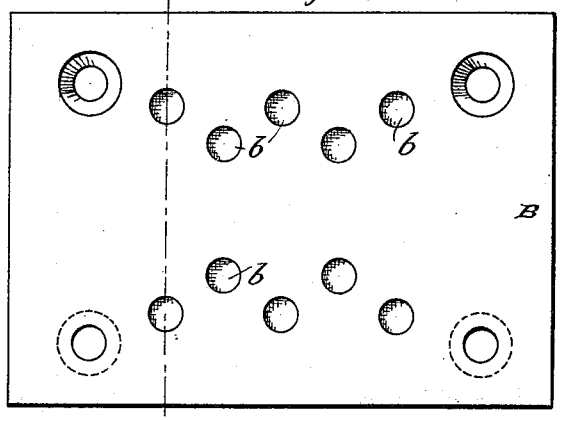
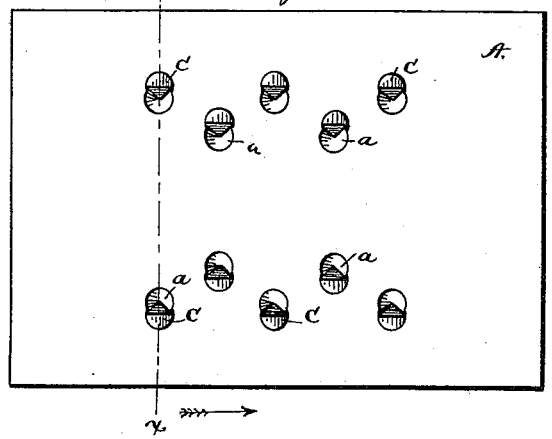
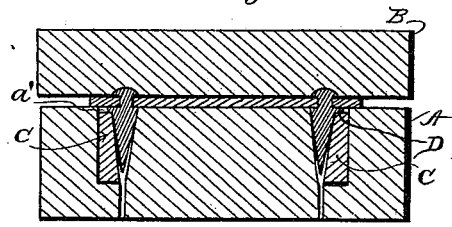
Witnesses
W. R. Edelen
C. N. Dorer
Inventor
Gilbert P. Kenehan
By Leggett & Leggett
Attys
THE NORRIS PETERS CO., PHOTO-LITHO., WASHINGTON, D. C.

UNITED STATES PATENT OFFICE.

GILBERT P. KENEHAN, OF CLEVELAND, OHIO, ASSIGNOR, BY MESNE ASSIGNMENTS, TO THE STEEL BELT FASTENER COMPANY, OF SAME PLACE.

DIE FOR MAKING BELT-FASTENERS.

SPECIFICATION forming part of Letters Patent No. 448,835, dated March 24, 1891.

Application filed September 5, 1890. Serial No. 364,044. (No model.)

*To all whom it may concern:*

Be it known that I, GILBERT P. KENEHAN, of Cleveland, in the county of Cuyahoga and State of Ohio, have invented certain new and useful Dies for the Manufacture of Belt-Fasteners; and I do hereby declare the following to be a full, clear, and exact description of the invention, such as will enable others skilled in the art to which it pertains to make and use the same.

My invention relates to improvements in the manufacture of belt-fasteners, the object being to manufacture strong and durable fasteners at a minimum cost. With this object in view I have devised the dies illustrated in the accompanying drawings, wherein—

Figures 1 and 2 are plan views of the opposing faces of the respective dies. Figs. 3 and 4 are transverse sections, respectively, on line *x x*, Figs. 1 and 2, Fig. 3 showing work in position between the dies ready to be operated upon, a portion of the work being broken away, and Fig. 4 showing the work after the dies have performed their operation.

A and B represent a pair of dies. Die A is provided with the desired number of holes *a*, of the proper size and shape to chamfer the teeth of belt-fasteners, and a recess *a'* is provided communicating with each hole *a* for the purpose hereinafter described.

Hole *a* is preferably made as follows: A hole is first drilled in die A, the depth of such hole being approximately of the length of the portion of the blank tooth to be operated upon by this die. This hole is then plugged, as shown at C, and another hole is drilled at one side of the first hole that was drilled. The second hole is preferably made to extend through the die to afford exit from below to any cuttings, dirt, or dust that may find access thereto, the hole being subsequently enlarged by means of a reamer approximately to the shape and size of the finished tooth of the belt-fastener, being made tapering or of a conical form, and being rounded save at the side formed by plug C, the latter at this side being flat or chamfered, recess *a'* being provided between the end of the plug and face of the die.

Die B is provided with shallow depressions *b*.

The dies are adapted to perform their functions simultaneously. Die A, by means of the flat side of hole *a*, correspondingly chamfers the tooth of the belt-fastener and upsets into recess *a'* the material that has been chamfered off the tooth, forming a shoulder D on the tooth, as shown in Fig. 4, such shoulder abutting the body of the belt-fastener, hole *a* in die A being preferably sufficiently larger in diameter at this point than the blank tooth to form a shoulder all round the tooth, as shown. Die B, by means of depression *b*, rivets the tooth, as shown in Fig. 4, The dies being adapted to perform their functions simultaneously, as aforesaid, it will be observed that after the plate that constitutes the body of the belt-fastener and the blank teeth have been placed in position between the dies the chamfering and upsetting of the teeth and and securing the latter to the body of the belt-fastener are done at one operation, and hence a great saving is effected in both labor and time, reducing the cost of the belt-fastener to a minimum.

What I claim is—

1. A die for simultaneously chamfering and upsetting the teeth of belt-fasteners, the die having a hole for each tooth, such hole being approximately of the shape and size of the chamfered portion of the finished tooth and having a recess communicating with said hole, whereby the material that is chamfered off the tooth is upset into said recess, and a shoulder formed on the tooth, substantially as set forth.

2. A pair of dies for simultaneously chamfering, upsetting, and fastening the teeth of belt-fasteners, one of the dies having holes and recesses communicating therewith for chamfering and upsetting the teeth and the other die having as many depressions for riveting the teeth, the two dies being adapted to act simultaneously, substantially as set forth.

In testimony whereof I sign this specification, in the presence of two witnesses, this 19th day of August, 1890.

GILBERT P. KENEHAN.

Witnesses:
C. H. DORER,
WARD HOOVER.